(12) United States Patent
Hashimoto et al.

(10) Patent No.: US 11,168,636 B2
(45) Date of Patent: Nov. 9, 2021

(54) STATE ESTIMATION DEVICE FOR INTERNAL COMBUSTION ENGINE, STATE ESTIMATION SYSTEM FOR INTERNAL COMBUSTION ENGINE, DATA ANALYSIS DEVICE, AND CONTROL DEVICE FOR INTERNAL COMBUSTION ENGINE

(71) Applicant: TOYOTA JIDOSHA KABUSHIKI KAISHA, Toyota (JP)

(72) Inventors: Yohsuke Hashimoto, Nagakute (JP); Akihiro Katayama, Toyota (JP); Yuta Oshiro, Nagoya (JP); Kazuki Sugie, Toyota (JP); Naoya Oka, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/004,658

(22) Filed: Aug. 27, 2020

(65) Prior Publication Data
US 2021/0108589 A1    Apr. 15, 2021

(30) Foreign Application Priority Data

Oct. 11, 2019  (JP) .............................. JP2019-187698

(51) Int. Cl.
*F02D 41/24*   (2006.01)
*G01K 13/02*   (2021.01)
*G01K 13/024*  (2021.01)

(52) U.S. Cl.
CPC ......... *F02D 41/2477* (2013.01); *G01K 13/02* (2013.01); *F02D 2200/0804* (2013.01); *F02D 2200/70* (2013.01); *G01K 13/024* (2021.01)

(58) Field of Classification Search
CPC ............. F02D 41/2477; F02D 2200/70; F02D 2200/0804; G01K 13/02; G01K 13/024
See application file for complete search history.

(56) References Cited

U.S. PATENT DOCUMENTS

| 5,247,444 A | * | 9/1993 | Arai ...................... F02D 11/107 |
| | | | 701/107 |
| 2007/0198955 A1 | * | 8/2007 | Nagatomo ............... G06K 9/48 |
| | | | 716/100 |

(Continued)

FOREIGN PATENT DOCUMENTS

| JP | 4-116245 A | 4/1992 |
| JP | 2006-83804 A | 3/2006 |

(Continued)

*Primary Examiner* — Joseph J Dallo
(74) *Attorney, Agent, or Firm* — Oblon, McClelland, Maier & Neustadt, L.L.P.

(57) ABSTRACT

A state estimation device for an internal combustion engine includes: a storage device that stores mapping data, the mapping data being data defining a mapping that takes as an input an internal combustion engine state variable and that generates as an output an estimated value for estimating the state of the internal combustion engine; and an execution device that executes an acquisition process of acquiring the internal combustion engine state variable and an estimation process of calculating the estimated value based on the output of the mapping. The mapping data is data learned by machine learning. When the estimated value is out of an acceptable range, the execution device executes a guard process of adjusting the estimated value to a value close to or within the acceptable range. When executing the guard process, the execution device calculates the value after the guard process as the estimated value.

8 Claims, 9 Drawing Sheets

(56) References Cited

U.S. PATENT DOCUMENTS

2009/0306866 A1* 12/2009 Malikopoulos ... B60W 30/1882
701/59
2015/0025731 A1* 1/2015 Uehara ................ B60W 50/14
701/23

FOREIGN PATENT DOCUMENTS

| JP | 2008-232109 A | 10/2008 |
| JP | 2010-64336 A | 3/2010 |
| JP | 2012-26302 A | 2/2012 |
| JP | 6547991 B1 | 7/2019 |

* cited by examiner

STATE ESTIMATION DEVICE FOR INTERNAL COMBUSTION ENGINE, STATE ESTIMATION SYSTEM FOR INTERNAL COMBUSTION ENGINE, DATA ANALYSIS DEVICE, AND CONTROL DEVICE FOR INTERNAL COMBUSTION ENGINE

INCORPORATION BY REFERENCE

The disclosure of Japanese Patent Application No. 2019-187698 filed on Oct. 11, 2019 including the specification, drawings and abstract is incorporated herein by reference in its entirety.

BACKGROUND

1. Technical Field

The disclosure relates to state estimation devices for internal combustion engines, state estimation systems for internal combustion engines, data analysis devices, and control devices for internal combustion engines.

2. Description of Related Art

A catalyst temperature prediction device described in Japanese Unexamined Patent Application Publication No. 2012-26302 (JP 2012-26302 A) uses neural networks configured so that parameters correlating with the load of an internal combustion engine are input to the input layer and engine torque values for the period from the present to a prediction time later are output. The neural networks are those trained by supervised learning.

SUMMARY

A catalyst temperature prediction device using a neural network such as the one described in JP 2012-26302 A performs processing based on learned information even when, e.g., a parameter that was not expected during learning is input. Accordingly, there may be a possibility that the catalyst temperature prediction device such as the one described in JP 2012-26302 A may output data that is out of an acceptable range from the output layer.

A first aspect of the disclosure relates to a state estimation device for an internal combustion engine. The state estimation device includes: a storage device that stores mapping data, the mapping data being data defining a mapping that takes as an input an internal combustion engine state variable that is a parameter indicating a state of the internal combustion engine and that generates as an output an estimated value for estimating the state of the internal combustion engine; and an execution device that executes an acquisition process of acquiring the internal combustion engine state variable and an estimation process of calculating the estimated value based on the output of the mapping that takes the internal combustion engine state variable as the input. The mapping data is data learned by machine learning. When the estimated value is out of an acceptable range, the execution device executes a guard process of adjusting the estimated value to a value close to the acceptable range or a value within the acceptable range. When executing the guard process, the execution device calculates the value after the guard process as the estimated value.

According to the above configuration, when the estimated value calculated by the estimation process is out of the acceptable range, the estimated value is adjusted to a value that is closer to the acceptable range than the estimated value before the guard process is, or is adjusted to a value within the acceptable range. This configuration thus reduces the possibility that the estimated value calculated by the estimation process may become an excessively unexpected value.

When the estimated value is larger than the acceptable range, the execution device may execute a guard process of adjusting the estimated value to a value equal to an upper limit value of the acceptable range. When the estimated value is smaller than the acceptable range, the execution device may execute a guard process of adjusting the estimated value to a value equal to a lower limit value of the acceptable range.

According to the above configuration, the estimated value calculated by the estimation process is adjusted to a value that is within the acceptable range and closest to the estimated value before the guard process. The estimated value calculated by the estimation process is thus adjusted to a value as close to the acquired value before the guard process as possible, and at the same time, the possibility is reduced that the estimated value calculated by the estimation process may become an unexpected result.

The state of the internal combustion engine may be an estimated value of a temperature of a catalyst provided in an exhaust passage of the internal combustion engine. The mapping data may be data defining a mapping that takes as inputs at least one of two variables that are an outside air temperature variable and an excess amount variable, a fluid energy variable, and a previous value of the estimated value of the temperature of the catalyst and that generates as an output the estimated value of the temperature of the catalyst, the outside air temperature variable being a variable related to a temperature of outside air around the internal combustion engine, the excess amount variable being a variable according to an amount by which an actual injection amount is in excess of an amount of fuel required to achieve a stoichiometric air-fuel ratio of an air-fuel mixture in a combustion chamber of the internal combustion engine, and the fluid energy variable being a state variable related to energy of fluid that flows into the catalyst. In the acquisition process, the execution device may acquire the at least one variable, the fluid energy variable, and the previous value of the estimated value. According to the above configuration, a guard technique can be applied to estimate the catalyst temperature.

The execution device may execute an acceptable range calculation process of calculating the acceptable range. The storage device may store an upper limit value calculation function and a lower limit value calculation function, the upper limit value calculation function being a function that inputs at least one of the internal combustion engine state variable and a variable derived from the internal combustion engine state variable and outputs the upper limit value of the acceptable range, and the lower limit value calculation function being a function that inputs at least one of the internal combustion engine state variable and the variable derived from the internal combustion engine state variable and outputs the lower limit value of the acceptable range. In the acceptable range calculation process, the execution device may calculate the upper limit value by inputting the internal combustion engine state variable acquired by the acquisition process to the upper limit value calculation function, and may calculate the lower limit value by inputting the internal combustion engine state variable acquired by the acquisition process to the lower limit value calculation function.

According to the above configuration, the upper limit value and the lower limit value of the acceptable range are calculated based on the internal combustion engine state variable acquired by the acquisition process. This configuration makes it easy to set an appropriate allowable range even the driving state of the internal combustion engine keeps changing.

When a divergence that indicates a difference between a current value and the previous value of the estimated value calculated by the estimation process is out of a predetermined range, the execution device may determine that the current value of the estimated value is out of the acceptable range.

According to this configuration, whether the current value of the estimated value is out of the acceptable range is determined according to the magnitude of the divergence that indicates the difference between the current value and the previous value of the estimated value calculated by the estimation process. Since whether the current value of the estimated value is out of the acceptable range can thus be determined by calculating the divergence of the calculated estimated value, the determination of whether the current value of the estimated value is out of the acceptable range can be implemented by relatively simple calculation.

A second aspect of the disclosure relates to a state estimation system for an internal combustion system including the execution device and the storage device which are described above. The execution device includes a first execution device and a second execution device. The first execution device is mounted on a vehicle and executes the acquisition process, a vehicle-side sending process of sending data acquired by the acquisition process to outside of the vehicle, and a vehicle-side reception process of receiving a signal that is based on an output calculated by the estimation process. The second execution device is mounted outside the vehicle and executes an external reception process of receiving the data sent by the vehicle-side sending process, the estimation process, and an external sending process of sending to the vehicle a signal that is based on the output calculated by the estimation process. According to the above configuration, the estimation process is executed outside of the vehicle. This configuration thus reduces calculation load on the on-board device.

A third aspect of the disclosure relates to a data analysis device including the second execution device and the storage device which are described above. A fourth aspect of the disclosure relates to a control device for an internal combustion engine including the first execution device described above.

BRIEF DESCRIPTION OF THE DRAWINGS

Features, advantages, and technical and industrial significance of exemplary embodiments will be described below with reference to the accompanying drawings, in which like signs denote like elements, and wherein.

DETAILED DESCRIPTION OF EMBODIMENTS

First Embodiment

Figure 1:
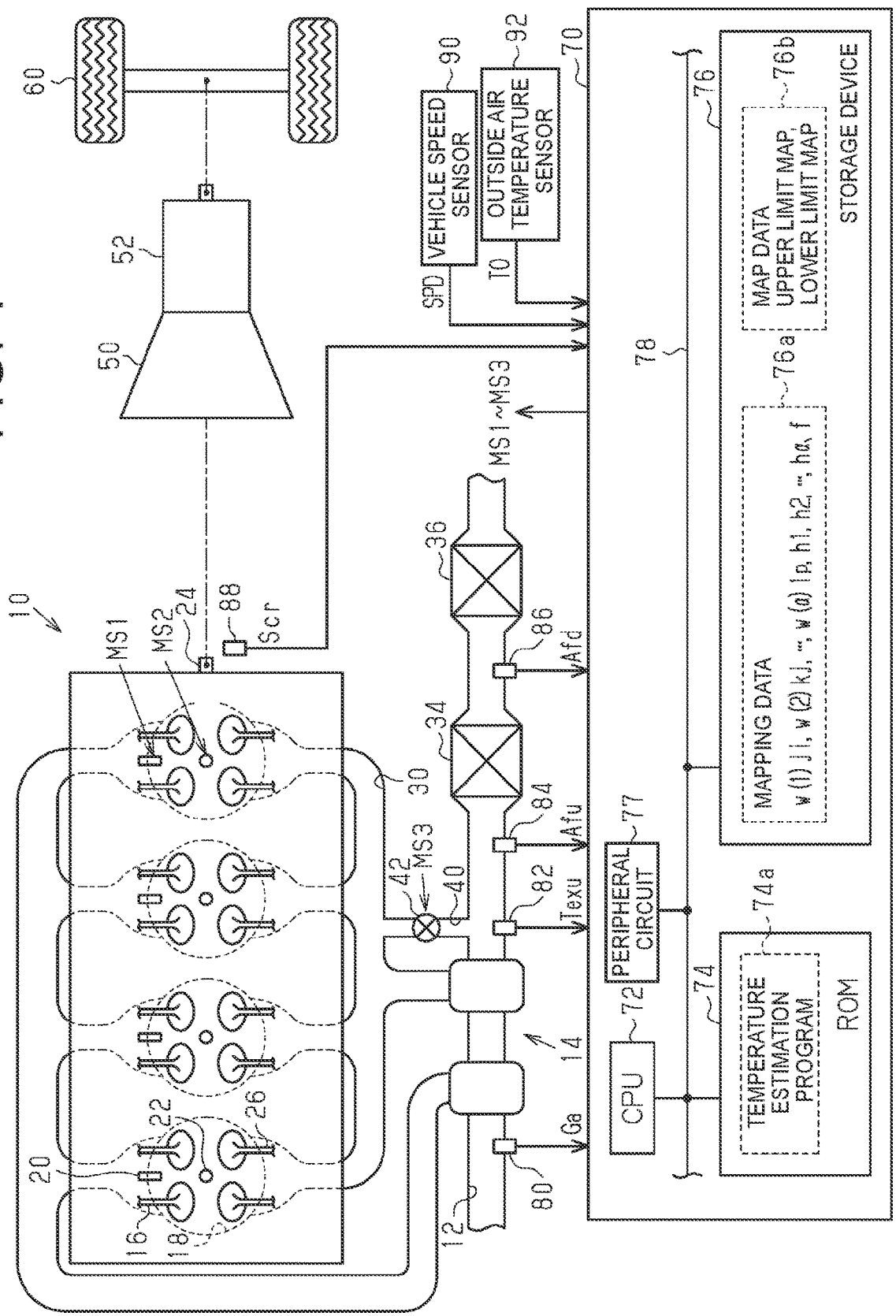
FIG. 1 illustrates the configuration of a control device according to a first embodiment and a drive system of a vehicle.

A first embodiment of a catalyst temperature estimation device will be described with reference to the drawings. In an internal combustion engine 10 mounted on a vehicle VC shown in FIG. 1, air sucked from an intake passage 12 flows downstream through a supercharger 14, and flows into combustion chambers 18 when intake valves 16 are opened. The internal combustion engine 10 is provided with direct injection valves 20 that directly inject fuel into the combustion chambers 18 and ignition systems 22 that cause spark discharge. In the combustion chambers 18, an air-fuel mixture is used for combustion, and the energy generated by the combustion is output as rotational energy of a crankshaft 24. The air-fuel mixture used for combustion is discharged as exhaust gas to an exhaust passage 30 when exhaust valves 26 are opened. A gasoline particulate filter (GPF) 34 is placed downstream of the supercharger 14 in the exhaust passage 30. The GPF 34 is a filter that captures particulate matter in the exhaust gas and that supports thereon a three-way catalyst with oxygen storage capacity. A catalyst 36, which is a three-way catalyst with oxygen storage capacity, is placed downstream of the GPF 34. The exhaust passage 30 includes a bypass passage 40 that causes the exhaust gas to bypass the supercharger 14 and flow into the GPF 34. The bypass passage 40 is provided with a wastegate valve (WGV) 42 that controls the flow-path sectional area of the bypass passage 40. Drive wheels 60 are mechanically coupled to the crankshaft 24 via a torque converter 50 and a speed change device 52.

The internal combustion engine 10 is a controlled object of a control device 70. The control device 70 operates operation parts of the internal combustion engine 10 such as the direct injection valves 20, the ignition systems 22, and the WGV 42 in order to control controlled variables for the internal combustion engine 10 such as torque and exhaust component ratio. FIG. 1 shows operation signals MS1 to MS3 for the direct injection valves 20, the ignition systems 22, and the WGV 42, respectively.

When controlling the controlled variables, the control device 70 refers to an intake air amount Ga that is detected by an air flow meter 80, an exhaust temperature Texu that is detected by an exhaust temperature sensor 82 disposed upstream of the GPF 34, and an upstream detection value Afu that is a detection value of an upstream air-fuel ratio sensor 84 disposed upstream of the GPF 34. The control device 70 also refers to a downstream detection value Afd that is a detection value of a downstream air-fuel ratio sensor 86 disposed between the GPF 34 and the catalyst 36, an output signal Scr of a crank angle sensor 88, a vehicle speed SPD that is detected by a vehicle speed sensor 90, and an outside air temperature TO that is detected by an outside air temperature sensor 92.

The control device 70 includes a CPU 72, a ROM 74, a storage device 76 that is an electrically rewritable nonvolatile memory, and a peripheral circuit 77. These components of the control device 70 are capable of communicating with each other via a local network 78. The peripheral circuit 77 includes a circuit that generates clock signals defining internal operations, a power supply circuit, a reset circuit, etc.

Figure 2:
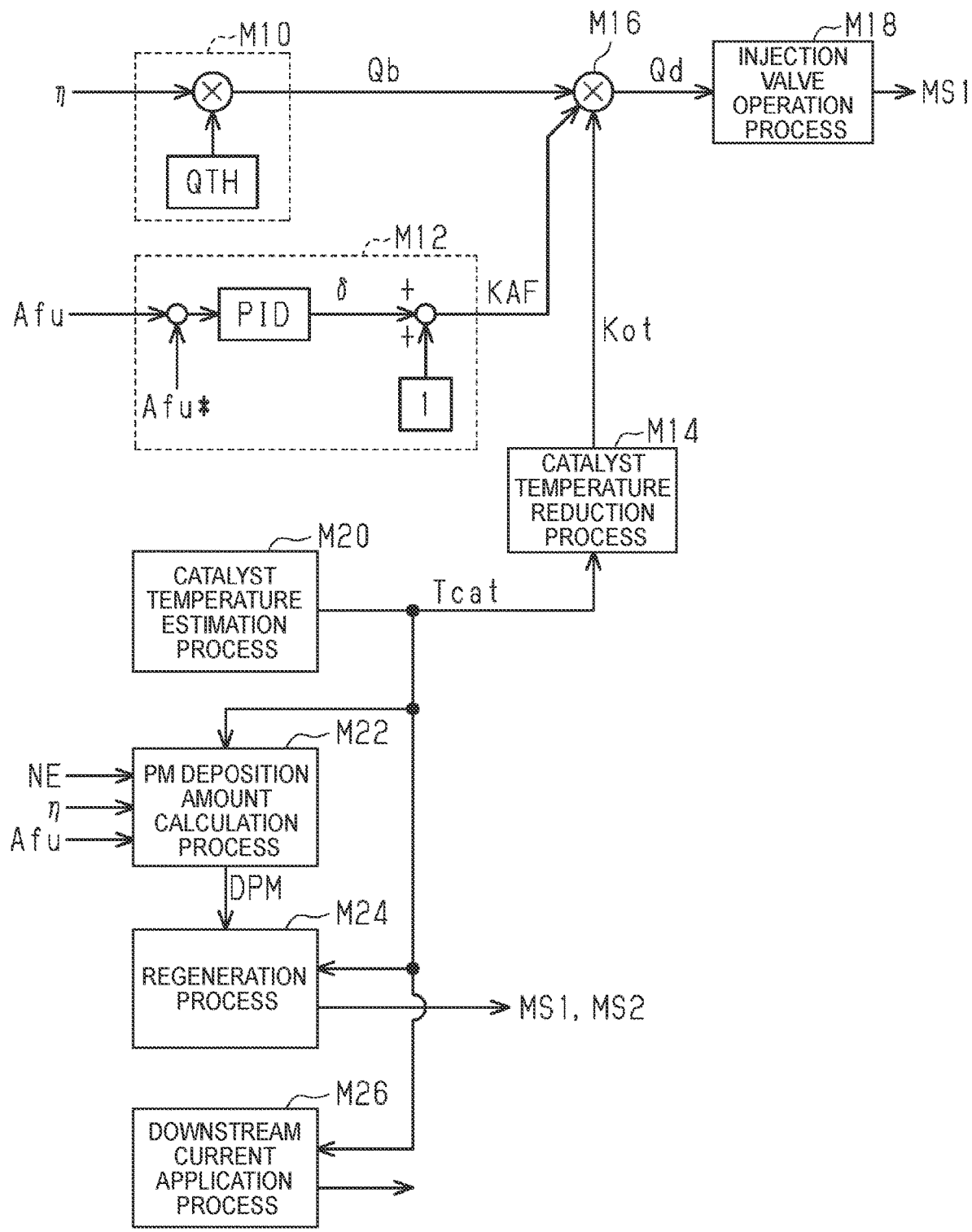
FIG. 2 is a block diagram illustrating a part of processes that are executed by the control device according to the first embodiment.

The control device 70 controls the controlled variables by the CPU 72 executing programs stored in the ROM 74. FIG. 2 illustrates a part of processes that are implemented by the CPU 72 executing the programs stored in the ROM 74.

A base injection amount calculation process M10 is a process of calculating a base injection amount Qb based on charging efficiency η. The base injection amount Qb is a base value of the amount of fuel for controlling the air-fuel ratio of the air-fuel mixture in the combustion chamber 18 to a desired air-fuel ratio. Specifically, in the case where the charging efficiency η is expressed as, e.g., a percentage, the base injection amount calculation process M10 is a process of calculating the base injection amount Qb by multiplying the amount of fuel QTH per 1% charging efficiency which is the amount of fuel for controlling the air-fuel ratio to a desired air-fuel ratio, by the charging efficiency η. The base injection amount Qb is the amount of fuel calculated, based on the amount of air that is supplied to the combustion chamber 18, in order to control the air-fuel ratio to a desired air-fuel ratio. In the present embodiment, the desired air-fuel ratio is, e.g., a stoichiometric air-fuel ratio. The charging efficiency η is a parameter that determines the amount of air that is supplied to the combustion chamber 18. The charging efficiency η is calculated by the CPU 72 based on a rotational speed NE and the intake air amount Ga. The rotational speed NE is calculated by the CPU 72 based on the output signal Scr of the crank angle sensor 88.

A feedback process M12 is a process of calculating a feedback correction factor KAF by adding "1" to a correction ratio δ of the base injection amount Qb, which is a feedback manipulated variable, namely a manipulated variable for feedback controlling the upstream detection value Afu to a desired value Afu*, and outputting the calculated feedback correction factor KAF. Specifically, in the feedback process M12, the sum of output values of a proportional element and a derivative element to which the difference between the upstream detection value Afu and the desired value Afu* is input and an output value of an integral element that holds and outputs an integrated value of the value corresponding to the difference is calculated as the correction ratio δ.

A catalyst temperature reduction process M14 is a process of calculating, when a catalyst temperature Tcat, which is an estimated value of the temperature of the GPF 34, is equal to or higher than a predetermined temperature, a value larger than "1" as an increase factor Kot in order to protect the GPF 34. When the catalyst temperature Tcat is lower than the predetermined temperature, the increase factor Kot is set to "1."

A requested injection amount calculation process M16 is a process of calculating a requested injection amount Qd by multiplying the base injection amount Qb by the feedback correction factor KAF and the increase factor Kot. In the present embodiment, when the increase factor Kot is larger than "1," the feedback process M12 is stopped and the feedback correction factor KAF is fixed.

An injection valve operation process M18 is a process of outputting, based on the requested injection amount Qd, the operation signal MS1 to the direct injection valve 20 in order to operate the direct injection valve 20. A catalyst temperature estimation process M20 is a process of estimating the catalyst temperature Tcat. The catalyst temperature estimation process M20 will be described in detail later.

A particulate matter (PM) deposition amount calculation process M22 is a process of calculating a PM deposition amount DPM based on the rotational speed NE, the charging efficiency η, the upstream detection value Afu, the catalyst temperature Tcat, etc. The PM deposition amount DPM is the amount of PM deposited on the GPF 34. Specifically, the PM deposition amount calculation process M22 includes a process of calculating the amount of PM that is discharged by map calculation based on map data having the rotational speed NE and the charging efficiency η as input variables and the amount of PM that is discharged to the exhaust passage 30 as an output variable. The PM deposition amount calculation process M22 includes a process of calculating the proportion of the amount of PM that is collected by the GPF 34 to the amount of discharged PM. In this calculation, the calculated value is larger when the PM deposition amount DPM is small than when the PM deposition amount is large. The PM deposition amount calculation process M22 further includes a process of calculating the amount of PM that is oxidized in the GPF 34 when the upstream detection value Afu is leaner than the stoichiometric air-fuel ratio. In this calculation, the calculated value is larger when the catalyst temperature Tcat is high than when the catalyst temperature Tcat is low.

The map data is a data set including discrete values of the input variables and values of the output variable which correspond to each value of the input variables. The map calculation is a process in which, for example, when the value of the input variable matches any of the values of the input variable in the map data, the calculation result is the value of the output variable in the map data which corresponds to the value of the input variable, while when the value of the input variable does not match any of the values of the input variable in the map data, the calculation result is a value obtained by interpolating a plurality of values of the output variable in the map data.

A regeneration process M24 is a process of oxidizing and removing the PM collected by the GPF 34 by performing temperature increase control for increasing the temperature of the GPF 34, when the PM deposition amount DPM is equal to or larger than a predetermined amount. The temperature increase control is performed by operating those operation parts which increase the temperature of exhaust gas out of the operation parts of the internal combustion engine 10, such as the direct injection valve 20 and the ignition systems 22. Specifically, the regeneration process M24 includes a process of controlling the catalyst temperature Tcat within a predetermined range by the temperature increase control.

A downstream current application process M26 is a process of starting current application to the downstream air-fuel ratio sensor 86 based on the catalyst temperature Tcat after the internal combustion engine 10 is started. In the present embodiment, the downstream current application process M26 is a process of starting current application to the downstream air-fuel ratio sensor 86 when the catalyst temperature Tcat becomes equal to or higher than a specified value. In this process, the catalyst temperature Tcat is regarded as the temperature of the downstream air-fuel ratio sensor 86.

Figure 3:
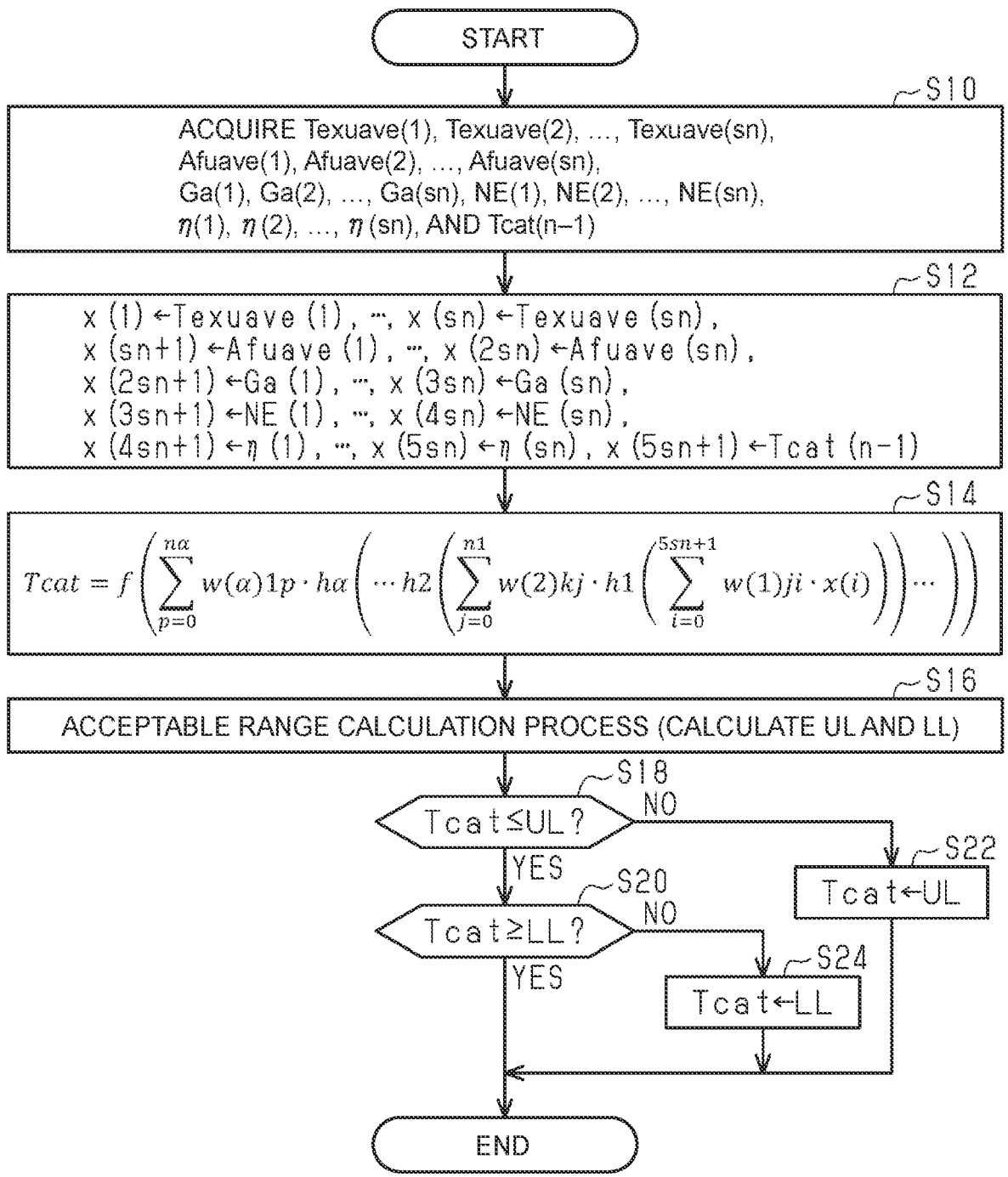
FIG. 3 is a flowchart of an estimation process of calculating an estimated value of a catalyst temperature according to the first embodiment.

FIG. 3 illustrates the steps of the catalyst temperature estimation process M20. For example, the process of FIG. 3 is implemented by the CPU 72 repeatedly executing a temperature estimation program 74a stored in the ROM 74 shown in FIG. 1 in, e.g., a predetermined cycle. Hereinafter, the steps of the process are denoted by numbers preceded by the letter S.

In the series of steps shown in FIG. 3, the CPU 72 first acquires time series data of each of an average exhaust temperature Texuave, an average upstream detection value Afuave, the intake air amount Ga, the rotational speed NE, and the charging efficiency η for a predetermined period, and the previous value Tcat(n−1) of the catalyst temperature Tcat, which is the catalyst temperature Tcat calculated last time by the process of FIG. 3 (S10). Hereinafter, numbers will used as "1, 2, . . . , sn" in chronological order of sampling, and for example, the time series data of the rotational speed NE is referred to as "NE(1) to NE(sn)." As used herein, "sn" is the number of data values included in the time series data of each variable.

The average exhaust temperature Texuave is an average value of exhaust temperatures Texu during a sampling interval of the time series data. That is, the CPU 72 samples the exhaust temperature Texu a plurality of times during the sampling interval of the time series data, calculates the average value of the sampled exhaust temperatures Texu as the average exhaust temperature Texuave. Similarly, the average upstream detection value Afuave is an average value of upstream detection values Afu during the sampling interval of the time series data.

Next, the CPU 72 substitutes the values acquired in S10 for input variables x(1) to x(5sn+1) of a mapping that generates the catalyst temperature Tcat as its output (S12). That is, when m=1 to sn, the CPU 72 substitutes the average exhaust temperature Texuave(m) for the input variable x(m), substitutes the average upstream detection value Afuave(m) for the input variable x(sn+m), substitutes the intake air amount Ga(m) for the input variable x(2sn+m), and substitutes the rotational speed NE(m) for the input variable x(3sn+m). The CPU 72 also substitutes the charging efficiency η(m) for the input variable x(4sn+m) and substitutes the previous value Tcat(n−1) of the catalyst temperature Tcat for the input variable x(5sn+1).

The CPU 72 then calculates the catalyst temperature Tcat by inputting the input variables x(1) to x(5sn+1) to the mapping defined by mapping data 76a stored in the storage device 76 shown in FIG. 1 (S14).

In the present embodiment, this mapping is configured by a neural network in which the number of intermediate layers is "α," activation functions h1 to hα of the intermediate layers are hyperbolic tangents, and an activation function f of the output layer is a rectified linear unit (ReLU). ReLU is a function that outputs the maximum of its input and zero. For example, the values of the nodes in the first intermediate layer are generated by inputting to the activation function h1 the outputs generated by inputting the input variables x(1) to x(5sn+1) to a linear mapping defined by a coefficient w(1)ji (j=0 to n1, i=0 to 5sn+1). That is, when m=1, 2, . . . , α, the values of the nodes in the $m^{th}$ intermediate layer are generated by inputting the outputs of a linear mapping defined by a coefficient w(m) to the activation function hm. The values n1, n2, . . . , and nα shown in FIG. 3 are the numbers of nodes in the first, second, . . . , and $α^{th}$ intermediate layers. In this example, w(1)j0 etc. are a bias parameter, and the input variable x(0) is defined as "1."

Subsequently, the CPU 72 executes an acceptable range calculation process (S16). The acceptable range calculation process is a process of calculating an acceptable range of the catalyst temperature Tcat calculated in S14. Specifically, the CPU 72 calculates an upper limit guard value UL and a lower limit guard value LL of the acceptable range from map data 76b stored in the storage device 76 shown in FIG. 1. The map data 76b includes an upper limit map and a lower limit map. The upper limit map is an upper limit value calculation function for calculating the upper limit guard value UL, and the lower limit map is a lower limit value calculation function for calculating the lower limit guard value LL. In the acceptable range calculation process, the CPU 72 calculates the upper limit guard value UL by inputting an average rotational speed Neave and average charging efficiency ηave to the upper limit map. The average rotational speed Neave is an average value of the rotational speeds NE(1) to NE(sn) acquired in S10, and the average charging efficiency rave is an average value of the charging efficiencies η(1) to η(sn) acquired in S10. The upper limit map is defined in advance by tests and simulations so that the upper limit value when the catalyst temperature changes on the condition that the vehicle speed and the outside air temperature, which are the factors that reduce the catalyst temperature, are reasonably low, is calculated based on the average rotational speed NEave and the average charging efficiency nave.

In the acceptable range calculation process, the CPU 72 calculates the lower limit guard value LL by inputting the average rotational speed Neave and the average charging efficiency nave to the lower limit map. The lower limit map is defined in advance by tests and simulations so that the lower limit value when the catalyst temperature changes on the condition that the vehicle speed and the outside air temperature, which are the factors that reduce the catalyst temperature, are reasonably high, is calculated based on the average rotational speed NEave and the average charging efficiency ηave. The lower limit guard value LL is therefore smaller than the upper limit guard value UL.

The CPU 72 then determines whether the catalyst temperature Tcat calculated in S14 is equal to or lower than the upper limit guard value UL calculated in S16 (S18). When the catalyst temperature Tcat calculated in S14 is equal to or lower than the upper limit guard value UL (S18: YES), the CPU 72 determines whether the catalyst temperature Tcat calculated in S14 is equal to or higher than the lower limit guard value LL (S20).

When the catalyst temperature Tcat calculated in S14 is equal to or higher than the lower limit guard value LL (S20: YES), the CPU 72 ends the series of steps shown in FIG. 3. When the CPU 72 executes the process of FIG. 3 for the first time, the CPU 72 uses a predetermined default value as the previous value Tcat(n−1) of the catalyst temperature Tcat. Even when the default value is not equal to an actual temperature, the catalyst temperature Tcat converges to a correct value as the process of FIG. 3 is repeated.

When the catalyst temperature Tcat calculated in S14 is higher than the upper limit guard value UL (S18: NO), the CPU 72 executes a guard process of adjusting the catalyst temperature Tcat to a value equal to the upper limit guard value UL (S22). The CPU 72 thus resets the catalyst temperature Tcat that is higher than the upper limit guard value UL to the same value as the upper limit guard value UL and ends the series of steps shown in FIG. 3.

When the catalyst temperature Tcat calculated in S14 is lower than the lower limit guard value LL (S20: NO), the CPU 72 executes a guard process of adjusting the catalyst temperature Tcat to a value equal to the lower limit guard value LL (S24). The CPU 72 thus resets the catalyst temperature Tcat that is lower than the lower limit guard value LL to the same value as the lower limit guard value LL and ends the series of steps shown in FIG. 3.

Figure 4:
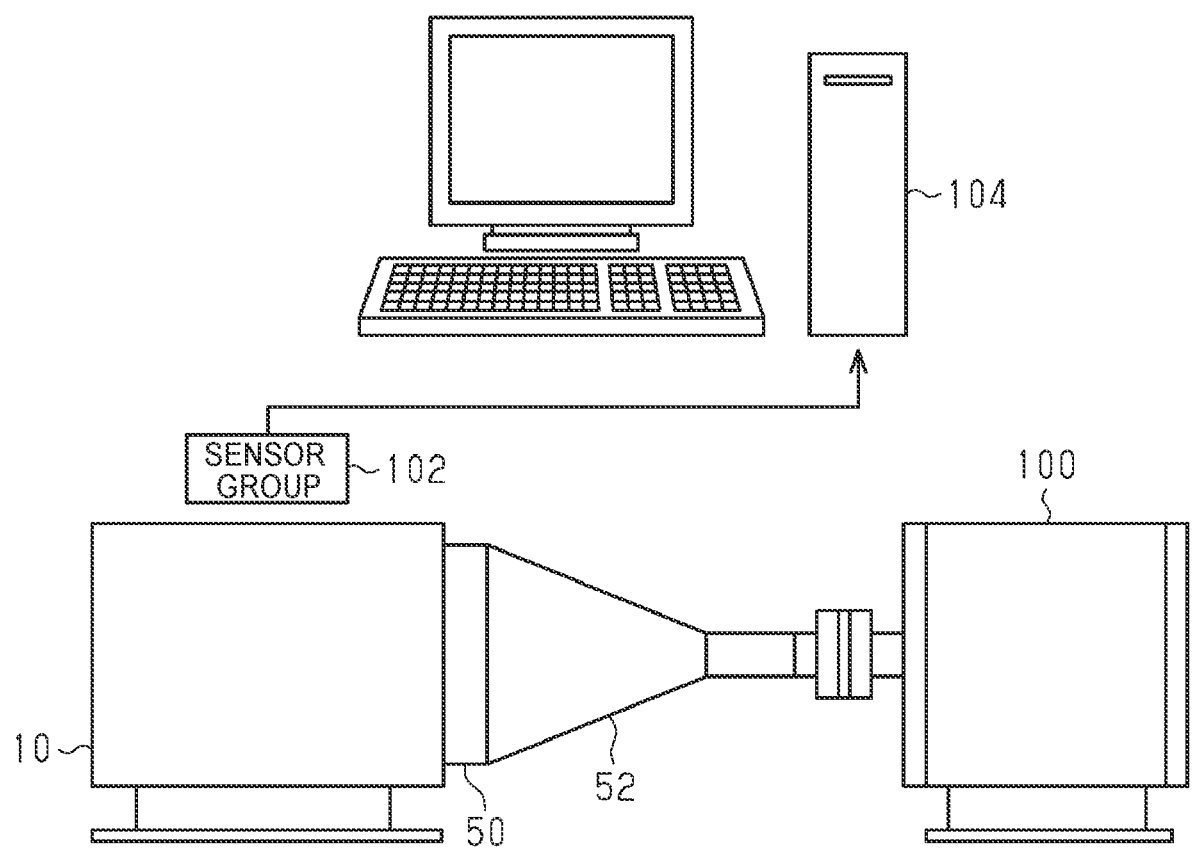
FIG. 4 illustrates a system that generates mapping data according to the first embodiment.

Next, a method for generating the mapping data 76a will be described. FIG. 4 illustrates a system for generating the mapping data 76a. As shown in FIG. 4, in the present embodiment, a dynamometer 100 is mechanically coupled to the crankshaft 24 of the internal combustion engine 10 via the torque converter 50 and the speed change device 52. Various state variables when the internal combustion engine 10 is operated are detected by a sensor group 102, and the detection results are input to an adapting device 104. The adapting device 104 is a computer that generates the mapping data 76a. The sensor group 102 includes the air flow meter 80, the exhaust temperature sensor 82, the upstream air-fuel ratio sensor 84, etc. which are sensors that detect a value for generating an input of the mapping. The sensor group 102 further includes a catalyst temperature sensor that detects the temperature of the GPF 34.

Figure 5:
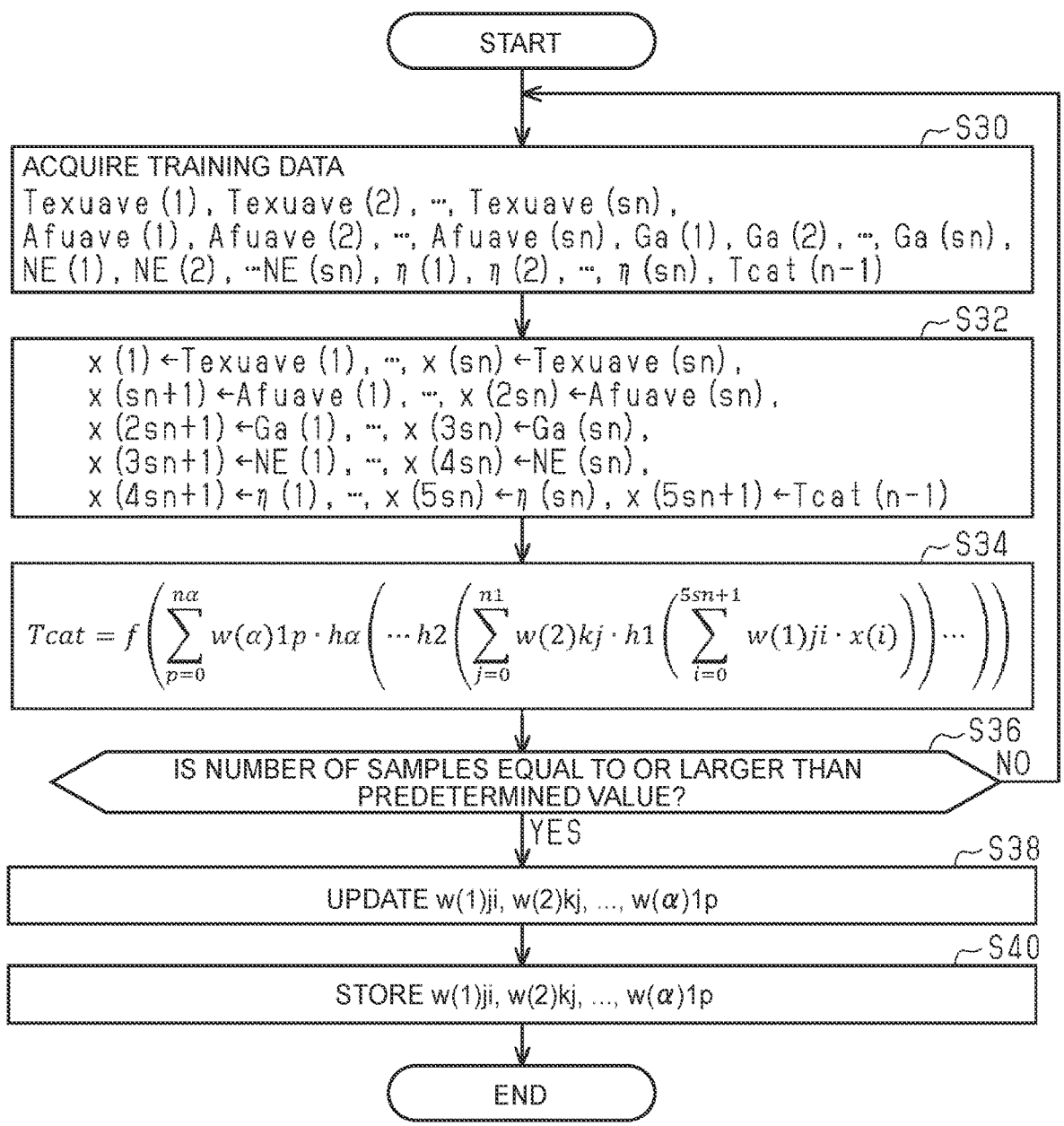
FIG. 5 is a flowchart of a process of learning mapping data according to the first embodiment.

FIG. 5 illustrates a process of generating mapping data. The adapting device executes the process of FIG. 5. For example, the adapting device 104 includes a CPU and a ROM, and the process of FIG. 5 is implemented by the CPU executing a program stored in the ROM.

In a series of steps shown in FIG. 5, the adapting device 104 first acquires, as training data, the same data as that acquired in S10, based on the detection results of the sensor group 102 (S30). In synchronization with the acquisition of the training data, the adapting device 104 acquires the detection value of the catalyst temperature sensor as training data out of the training data.

The adapting device 104 then substitutes the training data other than the training data for the input variables x(1) to x(5sn+1) in a manner similar to that of S12 (S32). The adapting device 104 then calculates the catalyst temperature Tcat in a manner similar to that of S14 by using the input variables x(1) to x(5sn+1) obtained in S32 (S34). The adapting device 104 determines whether the number of samples of the catalyst temperature Tcat calculated in S34 is equal to or larger than a predetermined value (S36). In order for the number of samples of the catalyst temperature Tcat to be equal to or larger than the predetermined value, it is required that the catalyst temperature Tcat have been calculated at various operating points defined by the rotational speed NE and the charging efficiency η by changing the operating state of the internal combustion engine 10.

When the adapting device 104 determines that the number of samples of the catalyst temperature Tcat is not equal to or larger than the predetermined value (S36: NO), the routine returns to S30. When the adapting device 104 determines that the number of samples of the catalyst temperature Tcat is equal to or larger than the predetermined value (S36: YES), the adapting device 104 updates the coefficients w(1)ji, w(2)kj, ..., W(α)1p so as to minimize the sum of squares of the difference between the detection value of the catalyst temperature sensor, which is the training data, and the catalyst temperature Tcat calculated in S34 (S38). The adapting device 104 then stores the coefficients w(1)ji, w(2)kj, ..., W(α)1p as the learned mapping data 76a (S40).

Functions and effects of the first embodiment will be described. According to the first embodiment, when the catalyst temperature Tcat output from the mapping in S14 is higher than the upper limit guard value or lower than the lower limit guard value, that is, when the catalyst temperature Tcat output from the mapping in S14 is out of the acceptable range, the guard process is executed to adjust the catalyst temperature Tcat to a value within the acceptable range. The catalyst temperature Tcat estimated by the estimation device therefore will not have an unexpected value.

According to the first embodiment, when the catalyst temperature Tcat calculated in S14 is higher than the upper limit guard value, the catalyst temperature Tcat is adjusted to a value that is within the acceptable range and closest to the catalyst temperature Tcat before the guard process, that is, the catalyst temperature Tcat is adjusted to a value equal to the upper limit guard value. The output of the mapping is thus adjusted to a value as close to the acquired value before the guard process as possible, and at the same time, the possibility is reduced that the output of the mapping may become an unexpected result. The same applies when the catalyst temperature Tcat calculated in S14 is lower than the lower limit guard value.

According to the first embodiment, the upper limit map and the lower limit map are used to calculate the upper limit guard value and the lower limit guard value based on the rotational speed NE and the charging efficiency η which are acquired every time the series of steps is performed. Accordingly, appropriate upper and lower limit guard values according to the change in driving state of the internal combustion engine 10 can be calculated as compared to the case where the upper limit guard value and the lower limit guard value are always set to fixed values.

The mapping data 76a is learned as data that defines a mapping that takes as its inputs the time series data of the average exhaust temperature Texuave, the average upstream detection value Afuave, the intake air amount Ga, the rotational speed NE, and the charging efficiency η, and the previous value Tcat(n−1) of the catalyst temperature Tcat and that generates the catalyst temperature Tcat as its output. The intake air amount Ga and the average exhaust temperature Texuave are fluid energy variables that are state variables related to the energy of fluid that flows into the GPF 34. The intake air amount Ga and the average upstream detection value Afuave are excess amount variables that are variables according to the amount by which an actual amount of fuel is in excess of the exact amount of fuel that completely reacts with oxygen contained in the fluid that flows into the GPF 34. However, this excess amount may have a negative value. That is, the excess amount has a negative value when the actual amount of fuel is smaller than the exact amount of fuel that completely reacts with oxygen contained in the fluid that flows into the GPF 34.

In addition to exchanging heat with the fluid that flows into the GPF 34, the GPF 34 generates heat when storing oxygen contained in the fluid and generates heat due to an oxidation reaction between the fuel in the fluid and the stored oxygen. Since a change in catalyst temperature Tcat from the previous value Tcat(n−1) which is caused by such heat exchange and heat generation of the GPF 34 can be known based on the fluid energy variables and the excess amount variables, it is considered that the catalyst temperature Tcat can be calculated using the fluid energy variables and the excess amount variables.

Second Embodiment

A second embodiment will be described with reference to the drawings, focusing on the differences from the first embodiment.

In the second embodiment, the process of calculating the catalyst temperature Tcat is executed outside the vehicle.

Figure 6:
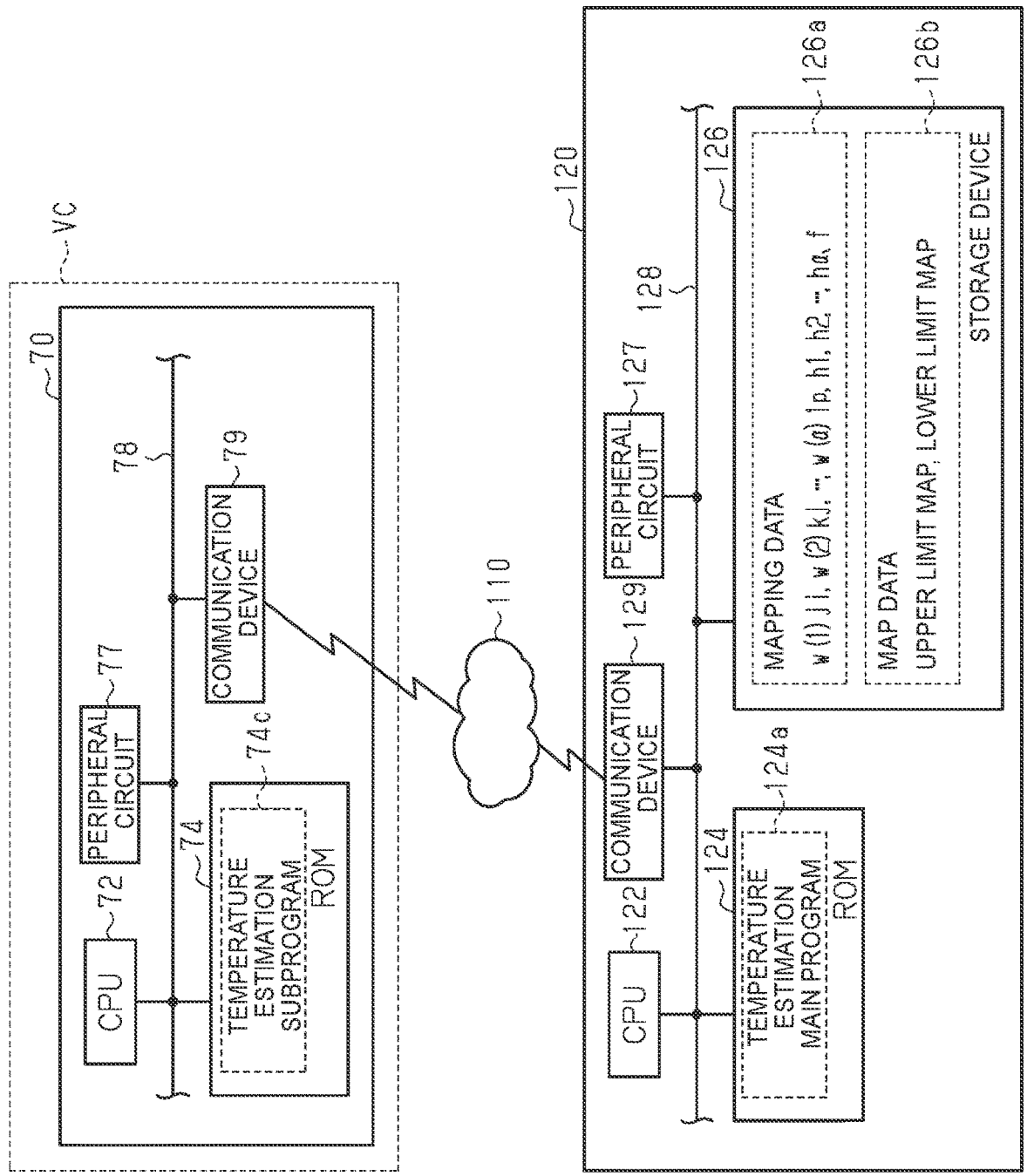
FIG. 6 illustrates the configuration of a state estimation system according to a second embodiment.

FIG. 6 illustrates a temperature estimation system according to the second embodiment. In FIG. 6, members corresponding to those shown in FIG. 1 are denoted with the same signs as those of FIG. 1 for convenience.

The control device 70 in the vehicle VC shown in FIG. 6 includes a communication device 79. The communication device 79 is a device for communicating with a center 120 via a network 110 outside the vehicle VC. The center 120 analyzes data sent from a plurality of vehicle VCs. The center 120 includes a CPU 122, a ROM 124, a storage device 126, a peripheral circuit 127, and a communication device 129. These components of the center 120 are capable of communicating with each other via a local network 128. The ROM 124 has a temperature estimation main program 124a stored therein, and the storage device 126 has mapping data 126a stored therein.

Figure 7:
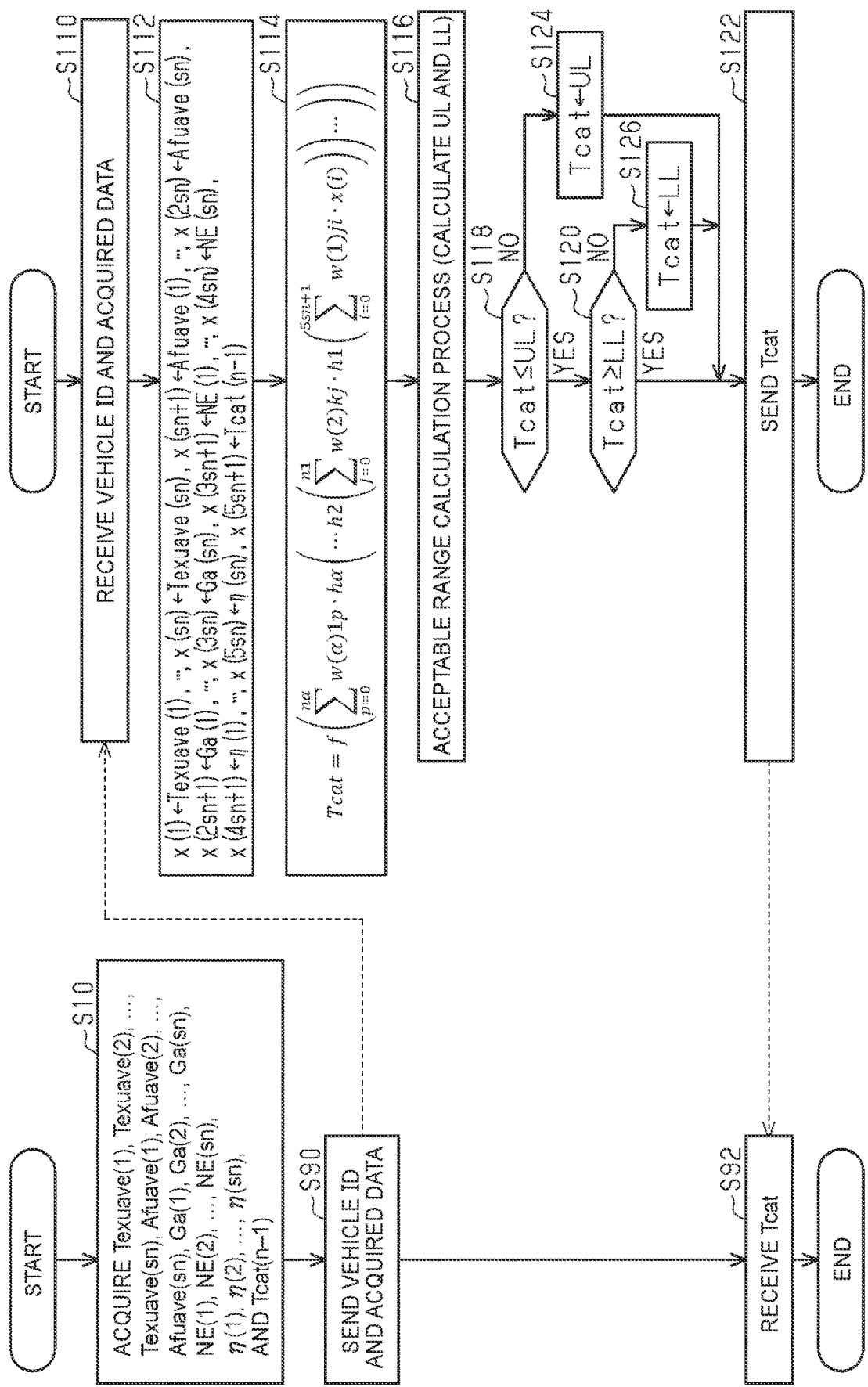
FIG. 7 is a flowchart of processes according to the second embodiment.

FIG. 7 illustrates processes that are executed by the system shown in FIG. 6. The process shown on the left side of FIG. 7 is implemented by the CPU 72 executing a temperature estimation subprogram 74c stored in the ROM 74 shown in FIG. 6. The process shown on the right side of FIG. 7 is implemented by the CPU 122 executing the temperature estimation main program 124a stored in the ROM 124. The processes of FIG. 7 will be described in chronological order of a temperature estimation process.

As shown on the left side of FIG. 7, the CPU 72 of the control device 70 in the vehicle VC first acquires time series data that is acquired in S10 described above (S10). The CPU 72 then sends the data acquired in S10, together with a vehicle ID, to the center 120 (S90). The vehicle ID is data indicating identification information on the vehicle.

As shown on the right side of FIG. 7, the CPU 122 of the center 120 receives the acquired data and the vehicle ID from the CPU 72 (S110) and substitutes the data received in S110 for an input variable x of a mapping (S112). In this example, the CPU 122 substitutes values similar to those in S12 for input variables x(1) to x(5sn+1).

The CPU 122 then calculates the catalyst temperature Tcat by inputting the input variables x(1) to x(5sn+1) generated in S112 to the mapping defined by the mapping data 126a (S114). The mapping defined by the mapping data 126a is similar to that used in S14.

Subsequently, the CPU 122 executes an acceptable range calculation process (S116). Specifically, the CPU 122 calculates the upper limit guard value UL and the lower limit guard value LL by inputting the average rotational speed Neave and the average charging efficiency nave to an upper limit map and a lower limit map which are defined by map data 126b. The upper and lower limit maps defined by the map data 126b are similar to those used in S16.

The CPU 122 then determines whether the catalyst temperature Tcat calculated in S114 is equal to or lower than the upper limit guard value UL calculated in S116 (S118). When the catalyst temperature Tcat calculated in S114 is equal to or lower than the upper limit guard value UL (S118: YES), the CPU 122 determines whether the catalyst temperature Tcat calculated in S114 is equal to or higher than the lower limit guard value LL (S120).

When the catalyst temperature Tcat calculated in S114 is equal to or higher than the lower limit guard value LL (S120: YES), the CPU 122 operates the communication device 129 to send a signal related to the catalyst temperature Tcat to the vehicle VC on which data has been sent to the center 120 in S90 (S122), and ends the series of steps shown on the right side of FIG. 7. As shown on the left side of FIG. 7, the CPU 72 receives the signal related to the catalyst temperature Tcat (S92) and ends the series of steps shown on the left side of FIG. 7.

When the processes of FIG. 7 are executed for the first time, a predetermined default value is used as the previous value Tcat(n−1) of the catalyst temperature Tcat. Even when the default value is not equal to an actual temperature, the catalyst temperature Tcat converges to a correct value as the processes of FIG. 7 are repeated.

When the catalyst temperature Tcat calculated in S114 is higher than the upper limit guard value UL (S118: NO), the CPU 122 executes a guard process of adjusting the catalyst temperature Tcat to a value equal to the upper limit guard value UL (S124). The CPU 122 thus resets the catalyst temperature Tcat that is higher than the upper limit guard value UL to the same value as the upper limit guard value UL and performs S122.

When the catalyst temperature Tcat calculated in S114 is lower than the lower limit guard value LL (S120: NO), the CPU 122 executes a guard process of adjusting the catalyst temperature Tcat to a value equal to the lower limit guard value LL (S126). The CPU 122 thus resets the catalyst temperature Tcat that is lower than the lower limit guard value LL to the same value as the lower limit guard value LL and performs S122.

Functions and effects of the second embodiment will be described. As described above, in the second embodiment, the catalyst temperature Tcat is calculated in the center 120. This configuration reduces calculation load on the CPU 72.

Third Embodiment

A third embodiment will be described with reference to the drawings, focusing on the differences from the first embodiment. In the following description of the third embodiment, configurations similar to those of the first embodiment are denoted with the same signs as those of the first embodiment, and detailed description thereof will be omitted or simplified.

Figure 8:
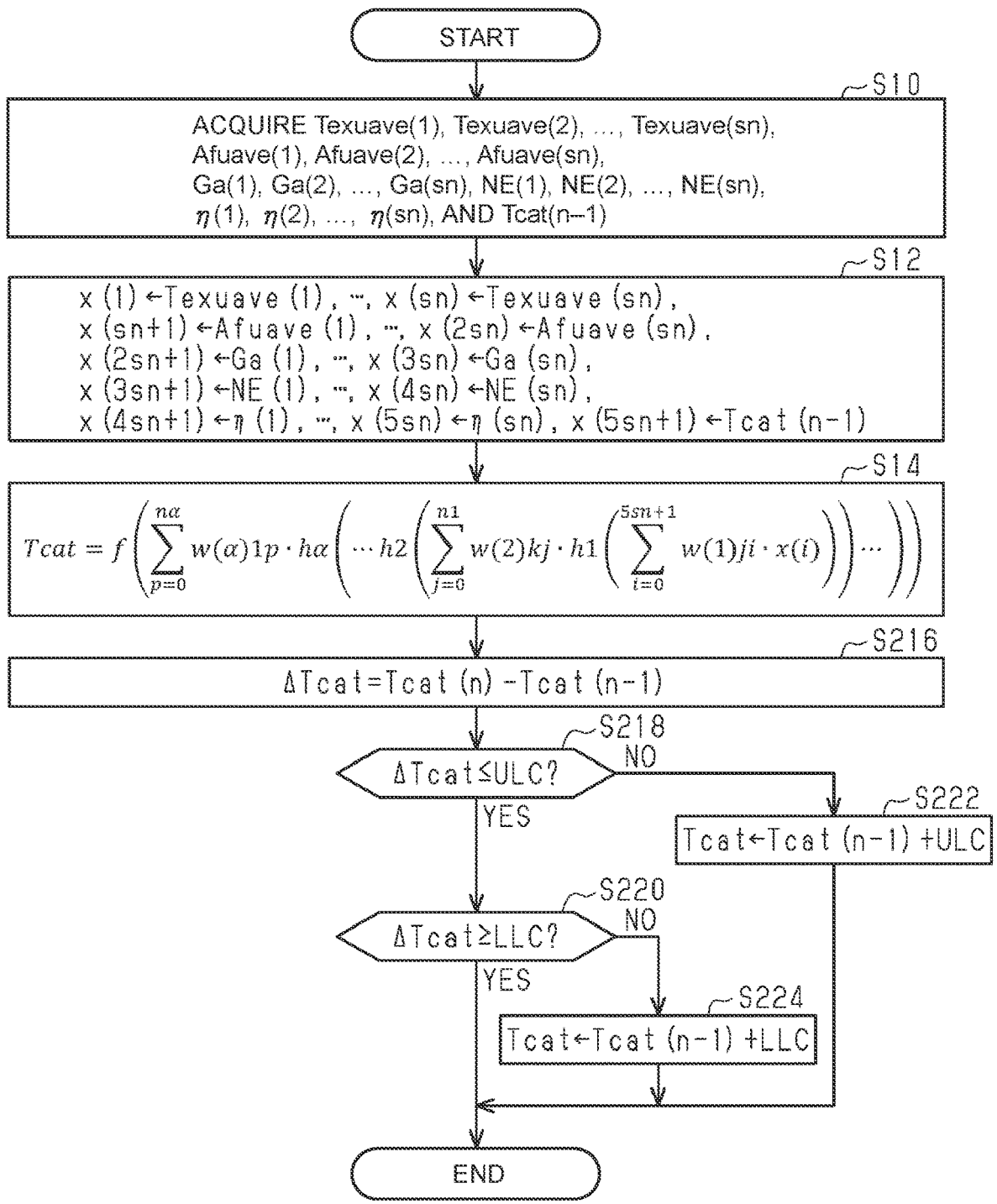
FIG. 8 is a flowchart of an estimation process of calculating an estimated value of a catalyst temperature according to a third embodiment.

FIG. 8 illustrates a catalyst temperature estimation process M20 in the third embodiment. The process of FIG. 8 is implemented by the CPU 72 repeatedly executing the temperature estimation program 74a stored in the ROM 74 shown in FIG. 1 in, e.g., a predetermined cycle.

In the series of steps shown in FIG. 8, S10 to S14 are similar to those in the first embodiment. The catalyst temperature Tcat calculated in S14 is the current value Tcat(n) of the catalyst temperature Tcat, and the catalyst temperature Tcat obtained by the series of steps in FIG. 8 is the previous value Tcat(n−1) of the catalyst temperature Tcat. The CPU 72 calculates the difference ΔTcat, which is obtained by subtracting the previous value Tcat(n−1) from the current value Tcat(n), as a divergence (S216).

The CPU 72 then determines whether the difference ΔTcat calculated in S216 is out of a predetermined range R. The catalyst temperature Tcat continuously changes with time. There is a limit on how much the catalyst temperature Tcat changes within the period of the cycle in which the process of FIG. 8 is repeated. Accordingly, in the third embodiment, a maximum increase in catalyst temperature Tcat in the cycle in which the process of FIG. 8 is repeated is determined in advance as the upper limit change ULC by tests and simulations. Similarly, a maximum decrease in catalyst temperature Tcat in the cycle in which the process of FIG. 8 is repeated is determined in advance as the lower limit change LLC by tests and simulations. The predetermined range R is set to the total of the upper limit change ULC and the lower limit change LLC.

Subsequently, the CPU 72 determines whether the difference ΔTcat calculated in S216 is equal to or smaller than the upper limit change ULC (S218). When the difference ΔTcat calculated in S216 is equal to or smaller than the upper limit change ULC (S218: YES), the CPU 72 determines whether the difference ΔTcat calculated in S216 is equal to or larger than the lower limit change LLC (S220).

When the difference ΔTcat is equal to or larger than the lower limit change LLC (S220: YES), the CPU 72 ends the series of steps shown in FIG. 8. When the CPU 72 executes the process of FIG. 8 for the first time, the CPU 72 uses a predetermined default value as the previous value Tcat(n−1) of the catalyst temperature Tcat. Even when the default value is not equal to an actual temperature, the catalyst temperature Tcat converges to a correct value as the process of FIG. 8 is repeated.

When the difference ΔTcat calculated in S216 is larger than the upper limit change ULC (S218: NO), the CPU 72 executes a guard process of adjusting the current value Tcat(n) to the previous value Tcat(n−1) plus the upper limit change ULC (S222). The CPU 72 then ends the series of steps shown in FIG. 8.

When the difference ΔTcat calculated in S216 is smaller than the lower limit change LLC (S220: NO), the CPU 72 executes a guard process of adjusting the current value Tcat(n) to the previous value Tcat(n−1) plus the lower limit change LLC (S224). The CPU 72 then ends the series of steps shown in FIG. 8.

Figure 9:
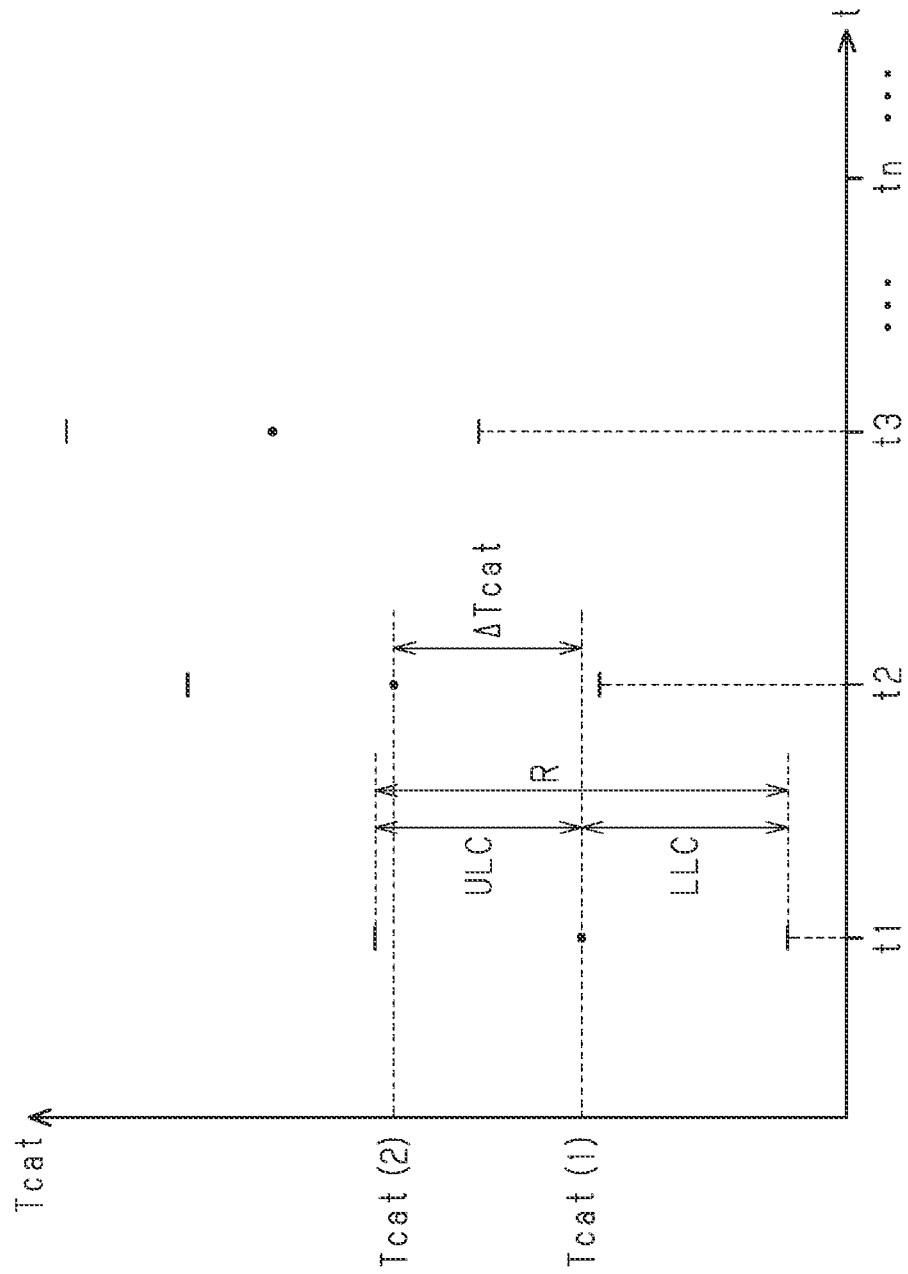
FIG. 9 is a graph illustrating a catalyst temperature at each time and a predetermined range according to the third embodiment.

Functions of the third embodiment will be described. As shown in FIG. 9, time t1 indicates when the series of steps shown in FIG. 8 is performed for the first time after the internal combustion engine 10 is started, and time t2 indicates when the series of steps shown in FIG. 8 is performed after time t1. Similarly, time to indicates when the series of steps shown in FIG. 8 is performed for the $n^{th}$ time after the internal combustion engine 10 is started. The catalyst temperature Tcat(1) is calculated in S14 at time t1, and the catalyst temperature Tcat(2) is calculated in S14 at time t2. In S16, the previous value Tcat(1) is subtracted from the current value Tcat(2) to calculate the difference ΔTcat. In the illustrated example, the difference ΔTcat is smaller than the upper limit change ULC and larger than the lower limit change LLC. The difference ΔTcat is therefore smaller than the predetermined range R. Accordingly, the catalyst temperature Tcat(2) at time t2 is set to the catalyst temperature Tcat(2) calculated in S14.

Effects of the third embodiment will be described. According to the third embodiment, when the difference ΔTcat between the current value Tcat(n) and the previous value Tcat(n−1) of the catalyst temperature Tcat is larger than the predetermined range R, it is determined that the current value Tcat(n) is out of the acceptable range. Since the catalyst temperature Tcat increases due to driving of the internal combustion engine 10, an increase in catalyst temperature Tcat that occurs during the cycle in which the series of steps shown in FIG. 8 is repeated is within a reasonable range. Accordingly, the determination of whether the current value Tcat(n) is out of the acceptable range can be implemented by relatively simple calculation.

Correspondence

The correspondence between the matters described in the above embodiments and the matters described in the section "SUMMARY" is as follows. The state of the internal combustion engine is exemplified by the temperature of the GPF 34. The estimated value for estimating the state of the internal combustion engine is exemplified by the catalyst temperature Tcat. The internal combustion engine state variable is exemplified by the average exhaust temperature Texuave, the average upstream detection value Afuave, the intake air amount Ga, the rotational speed NE, the charging efficiency η, and the previous value Tcat(n−1) of the catalyst temperature Tcat. The execution device is exemplified by the CPU 72 and the ROM 74. The acquisition process is exemplified by step S10. The temperature calculation process is exemplified by steps S12 to S24 and steps S112 to S120, S122, and S124. The guard process is exemplified by steps S22, S24 and steps S124, S126.

The upper limit value of the acceptable range is exemplified by the upper limit guard value UL, and the lower limit value of the acceptable range is exemplified by the lower limit guard value LL.

The catalyst is exemplified by the GPF 34. The fluid energy variable is exemplified by a data set of the average exhaust temperature Texuave and the intake air amount Ga, etc. The outside air temperature variable is exemplified by the outside air temperature TO, and the excess amount variable is exemplified by a data set of the average upstream detection value Afuave and the intake air amount Ga, etc.

The acceptable range calculation process is exemplified by step S16. The upper limit value calculation function is exemplified by the upper limit map, and the lower limit value calculation function is exemplified by the lower limit map.

The divergence is exemplified by the difference ΔTcat between the present value Tcat(n) and the previous value Tcat(n−1) of the catalyst temperature Tcat.

The catalyst temperature estimation system is exemplified by the control device 70 and the center 120. The execution device is exemplified by the CPU 72 and the ROM 74. The second execution device is exemplified by the CPU 122 and the ROM 124. The acquisition process is exemplified by step S10, the vehicle-side sending process is exemplified by step S90, and the vehicle-side reception process is exemplified by step S92. The external reception process is exemplified by step S110.

The data analysis device is exemplified by the center 120.

The control device for the internal combustion engine is exemplified by the control device 70.

Other Embodiments

The above embodiments may be modified as follows. The above embodiments and the following modifications may be combined as appropriate unless technical inconsistency occurs.

Internal Combustion Engine State Variable

In the above embodiments, the internal combustion engine state variable that is input to the mapping is not limited to the examples shown in the above embodiments. The internal combustion engine state variable is not particularly limited as long as it is a parameter indicating the state of the internal combustion engine 10. For example, in the first embodiment, the internal combustion engine state variable may be the outside air temperature TO, which functions as the outside air temperature variable that is a variable related to the temperature of the outside air around the internal combustion engine 10, instead of the average upstream detection value Afuave.

State of Internal Combustion Engine

The estimated value that is calculated by the estimation process may be the state of the internal combustion engine 10 other than the catalyst temperature Tcat. For example, the estimated value that is calculated by the estimation process may be the PM deposition amount DPM or the fuel pressure that is the pressure of fuel that is supplied to the direct injection valve 20.

Guard Process

In the above embodiments, when the catalyst temperature Tcat obtained as the output of the mapping is higher than the upper limit guard value UL, the catalyst temperature Tcat is reset to the same value as the upper limit guard value UL. However, the catalyst temperature Tcat may be reset to any value close to the upper limit guard value UL. When the catalyst temperature Tcat is lower than the lower limit guard value LL, the catalyst temperature Tcat may be reset to any value close to the lower limit guard value LL. That is, when the catalyst temperature Tcat obtained as the output of the mapping is out of the acceptable range, the catalyst temperature Tcat is reset to a value close to or within the acceptable range. In this case, for example, when the output of the mapping is an extremely large or small value due to an input value in an unlearned range etc. being input to the mapping, the catalyst temperature Tcat obtained as the output of the mapping can be made close to the acceptable range.

Acceptable Range

In the first and second embodiments, the acceptable range is defined by the upper limit guard value UL and the lower limit guard value LL, and the upper limit guard value UL and the lower limit guard value LL are determined by the upper limit map and the lower limit map. However, the acceptable range may be a predetermined fixed range. For example, the results of experiments and simulations show that the catalyst temperature Tcat is within a certain range. Estimated values that are out of this certain range can be excluded by setting the acceptable range to a fixed range.

Divergence

In the third embodiment, the difference $\Delta$Tcat is calculated as a divergence. The ratio obtained by dividing the previous value Tcat(n−1) by the current value Tcat(n) may be used as the divergence.

Predetermined Range

In the third embodiment, the predetermined range R need not always be fixed, but may vary based on the catalyst temperature Tcat at each time t. For example, the predetermined range R may be determined for each of the low temperature range, the medium temperature range, and the high temperature range of the catalyst temperature Tcat. Specifically, it is herein assumed that, for the medium temperature range of the catalyst temperature Tcat, the upper limit change ULC and the lower limit change LLC are set to reasonable values. In this case, for the low temperature range of the catalyst temperature Tcat, the upper limit change ULC may be set to a value larger than that for the medium temperature range of the catalyst temperature Tcat, and the lower limit change LLC may be set to a value smaller than that for the medium temperature range of the catalyst temperature Tcat. In this case, for the high temperature range of the catalyst temperature Tcat, the upper limit change ULC is set to a value smaller than that for the medium temperature range of the catalyst temperature Tcat, and the lower limit change LLC is set to a value larger than that for the medium temperature range of the catalyst temperature Tcat. The catalyst temperature Tcat is determined by the balance between the factors that increase the catalyst temperature Tcat and the factors that reduce the catalyst temperature Tcat. When the catalyst temperature Tcat is in the high temperature range, it takes a reasonable amount of time for the catalyst temperature Tcat to further increase. Accordingly, by setting the upper limit change ULC as described above, the predetermined range R can be set according to the catalyst temperature Tcat.

In the third embodiment, the predetermined range R may vary depending on time t. For example, during a certain time period from the start of the internal combustion engine 10 until the catalyst temperature Tcat is increased to a reasonable temperature, the total of the upper limit change ULC and the lower limit change LLC, which is the predetermined range R, may gradually decrease with time until it reaches a predetermined time t. The predetermined time t is set in advance by tests and simulations to the time the GPF 34 cooled down with the internal combustion engine 10 being stopped for a reasonable time becomes sufficiently hot. The predetermined range R need not be a predetermined value, but may be calculated using map data, a function, etc. every time the series of steps shown in FIG. 8 is performed.

Temperature Variable for Fluid

The temperature variable for the fluid, which is the fluid energy variable, is not limited to the average exhaust temperature Texuave, and may be the exhaust temperature Texu. The temperature variable for the fluid is not limited to the variable based on the value of the exhaust temperature detected by the exhaust temperature sensor 82, and may be, e.g., an estimated value.

Fluid Energy Variables

For example, in the processes of FIGS. 3 and 7, the intake air amount Ga need not be included in the input variables. Even in this case, since the rotational speed NE and the charging efficiency η are the input variables in these processes, the fluid energy variables are three variables, namely the average exhaust temperature Texuave, the rotational speed NE, and the charging efficiency η.

For example, the time series data of the fluid energy variables may be composed of time series data of the average exhaust temperature Texuave and a single value of the intake air amount Ga, or may be composed of time series data of the average exhaust temperature Texuave and a single value of the average intake air amount Gaave. For example, the time series data of the fluid energy variables may be composed of time series data of the average exhaust temperature Texuave and single sampling values of the rotational speed NE and the charging efficiency η or may be composed of time series data of the average exhaust temperature Texuave and single sampling values of the average rotational speed NEave and the average charging efficiency nave.

Excess Amount Variables

For example, in the processes of FIGS. 3 and 7, the intake air amount Ga may not be included in the input variables. Even in this case, since the rotational speed NE and the charging efficiency η are the input variables in these processes, the excess amount variables are three variables, namely the average upstream detection value Afuave, the rotational speed NE, and the charging efficiency η.

The upstream detection value Afu may be used instead of the average upstream detection value Afuave. For example, the time series data of the excess amount variables may be composed of time series data of the average upstream detection value Afuave and a single value of the intake air amount Ga. For example, the time series data of the excess amount variables may be composed of time series data of the average upstream detection value Afuave and single sampling values of the rotational speed NE and the charging efficiency η, or may be composed of time series data of the average upstream detection value Afuave and single sampling values of the average rotational speed NEave and the average charging efficiency ηave.

In the case where the GPF 34 is placed downstream of the catalyst 36 and the temperature of the GPF 34 is estimated as described in the part titled "Filter" below, a downstream detection value Afd or an average value thereof is used as the excess amount variable instead of the upstream detection value Afu or the average value thereof.

For example, in the case where the GPF 34 is placed downstream of the catalyst 36 and the temperature of the GPF 34 is estimated as described in the part titled "Filter" below, the downstream detection value Afd or the average value thereof is used as the input of the mapping instead of the upstream detection value Afu or the average value thereof. The detection value of a sensor placed between the GPF 34 and the catalyst 36 is used in the case where the detection value of the exhaust temperature or its average value is used as the input of the mapping.

The inputs to the neural network, the inputs to the regression equation, etc. are not limited to those in which each dimension is a dimension of a single physical quantity. For example, regarding a part of the plurality of kinds of physical quantities that are the inputs of the mapping in the above embodiments etc., some principal components obtained by principal component analysis of the part of the plurality of kinds of physical quantities may be directly input to the neural network or the regression equation, instead of the part of the plurality of kinds of physical quantities being directly input to the neural network or the regression equation. In the case where the principal components are input to the neural network or the regression equation, it is not essential that only a part of the inputs of the neural network or the regression equation be the principal components. All of the inputs of the neural network or the regression equation may be the principal components. When the principal components are included in the inputs of the mapping, the mapping data 76a, 126a includes data that defines a mapping that determines defines the principal components.

Mapping Data

In the above embodiments, the activation functions h1, h2, . . . , and hα in S14, S34, and S114 are hyperbolic tangents, and the activation function f is ReLU. However, the disclosure is not limited to this. For example, the activation functions h1, h2, . . . , and hα in S14 and S114 may be ReLUs or may be logistic sigmoid functions. For example, the activation function f may be a logistic sigmoid function. The neural network shown in the figures has more than two intermediate layers. However, the disclosure is not limited to this, and the neural network may have one or two intermediate layers.

Generation of Mapping Data

In the above embodiments, data acquired when the internal combustion engine 10 is operated with the dynamometer 100 connected to the crankshaft 24 via the torque converter 50 and the speed change device 52 is used as the training data. However, the disclosure is not limited to this. For example, data acquired when the internal combustion engine 10 mounted on the vehicle VC is driven may be used as the training data.

Data Analysis Device

The process shown on the right side of FIG. 7 may be executed by, e.g., a mobile terminal carried by the user.

Execution Device

The execution device is not limited to the one that includes the CPU 72 (122) and the ROM 74 (124) and that executes processes via software. For example, the execution device may include a dedicated hardware circuit (e.g., an application-specific integrated circuit (ASIC) etc.) that executes at least a part of the processes that are executed via software in the above embodiments via hardware. That is, the execution device has any of the following configurations (a) to (c). (a) The execution device includes a processing device that executes all of the above processes according to programs and a program storage device, such as a ROM, that stores the programs. (b) The execution device includes a processing device that executes a part of the above processes according to programs, a program storage device, and a dedicated hardware circuit that executes the remainder of the processes. (c) The execution device includes a dedicated hardware circuit that executes all of the above processes. The execution device may include a plurality of the software execution devices each including the processing device and the program storage device and/or a plurality of the dedicated hardware circuits.

Storage Device

In the above embodiments, the storage device that stores the mapping data 76a, 126a is provided separately from the storage device (ROM 74, 124) that stores the temperature estimation program 74a or the temperature estimation main program 124a. However, the disclosure is not limited to this.

Object with Temperature to be Estimated

An object with temperature to be estimated is not limited to the GPF 34 and may be, e.g., the three-way catalyst.

Filter

The GPF 34 and the catalyst 36 may be reversed in position. The filter is not limited to the one supporting a three-way catalyst thereon. For example, a three-way catalyst may be placed upstream of a single catalytic converter, and a filter that does not support a three-way catalyst thereon may be placed downstream of the three-way catalyst.

Internal Combustion Engine

In the above embodiments, the direct injection valve that injects fuel into the combustion chamber 18 is illustrated as the fuel injection valve. However, the disclosure is not limited to this. For example, the fuel injection valve may be a port injection valve that injects fuel into the intake passage 12. Alternatively, the internal combustion engine may include both a port injection valve and a direct injection valve.

The internal combustion engine is not limited to the spark ignition internal combustion engine and may be, e.g., a compression ignition internal combustion engine that uses light oil etc. as fuel. It is not essential that the internal combustion engine forms a drive system. For example, the internal combustion engine may be mounted on what is called a series hybrid vehicle in which a crankshaft is mechanically coupled to an on-board generator and power speed change device between the crankshaft and drive wheels is cut off.

Vehicle

The vehicle is not limited to the vehicle in which the internal combustion engine is the only device that generates a propulsive force for the vehicle. For example, the vehicle may be a parallel hybrid vehicle or a series-parallel hybrid vehicle in addition to the series hybrid vehicle described above in the part titled "Internal Combustion Engine."

What is claimed is:

1. A state estimation device for an internal combustion engine, the state estimation device comprising:
a storage device that stores mapping data, the mapping data being data defining a mapping that takes as an input an internal combustion engine state variable that is a parameter indicating a state of the internal combustion engine and that generates as an output an estimated value for estimating the state of the internal combustion engine; and an execution device that executes an acquisition process of acquiring the internal combustion engine state variable and an estimation process of calculating the estimated value based on the output of the mapping that takes the internal combustion engine state variable as the input, wherein:

the mapping data is data learned by machine learning;

when the estimated value is out of an acceptable range, the execution device executes a guard process of adjusting the estimated value to a value close to the acceptable range or a value within the acceptable range; and when executing the guard process, the execution device calculates the value after the guard process as the estimated value.

2. The state estimation device according to claim 1, wherein when the estimated value is larger than the acceptable range, the execution device executes the guard process that is a process of adjusting the estimated value to a value equal to an upper limit value of the acceptable range, and when the estimated value is smaller than the acceptable range, the execution device executes the guard process that is a process of adjusting the estimated value to a value equal to a lower limit value of the acceptable range.

3. The state estimation device according to claim 1, wherein:

the state of the internal combustion engine is an estimated value of a temperature of a catalyst provided in an exhaust passage of the internal combustion engine;

the mapping data is data defining a mapping that takes as inputs at least one of two variables that are an outside air temperature variable and an excess amount variable, a fluid energy variable, and a previous value of the estimated value of the temperature of the catalyst and that generates as an output the estimated value of the temperature of the catalyst, the outside air temperature variable being a variable related to a temperature of outside air around the internal combustion engine, the excess amount variable being a variable according to an amount by which an actual injection amount is in excess of an amount of fuel required to achieve a stoichiometric air-fuel ratio of an air-fuel mixture in a combustion chamber of the internal combustion engine, and the fluid energy variable being a state variable related to energy of fluid that flows into the catalyst; and in the acquisition process, the execution device acquires the at least one variable, the fluid energy variable, and the previous value of the estimated value.

4. The state estimation device according to claim 1, wherein:

the execution device executes an acceptable range calculation process of calculating the acceptable range;

the storage device stores an upper limit value calculation function and a lower limit value calculation function, the upper limit value calculation function being a function that inputs at least one of the internal combustion engine state variable and a variable derived from the internal combustion engine state variable and outputs an upper limit value of the acceptable range, and the lower limit value calculation function being a function that inputs at least one of the internal combustion engine state variable and the variable derived from the internal combustion engine state variable and outputs a lower limit value of the acceptable range; and in the acceptable range calculation process, the execution device calculates the upper limit value by inputting the internal combustion engine state variable acquired by the acquisition process to the upper limit value calculation function, and calculates the lower limit value by inputting the internal combustion engine state variable acquired by the acquisition process to the lower limit value calculation function.

5. The state estimation device according to claim 1, wherein when a divergence that indicates a difference between a current value and a previous value of the estimated value calculated by the estimation process is out of a predetermined range, the execution device determines that the current value of the estimated value is out of the acceptable range.

6. A state estimation system for an internal combustion system, the state estimation system comprising:

the execution device according to claim 1; and the storage device according to claim 1, wherein:

the execution device includes a first execution device and a second execution device, the first execution device is mounted on a vehicle and executes the acquisition process, a vehicle-side sending process of sending data acquired by the acquisition process to outside of the vehicle, and a vehicle-side reception process of receiving a signal that is based on an output calculated by the estimation process; and the second execution device is mounted outside the vehicle and executes an external reception process of receiving the data sent by the vehicle-side sending process, the estimation process, and an external sending process of sending to the vehicle a signal that is based on the output calculated by the estimation process.

7. A data analysis device, comprising the second execution device and the storage device according to claim 6.

8. A control device for an internal combustion engine, comprising the first execution device according to claim 6.

* * * * *